United States Patent Office 3,700,562
Patented Oct. 24, 1972

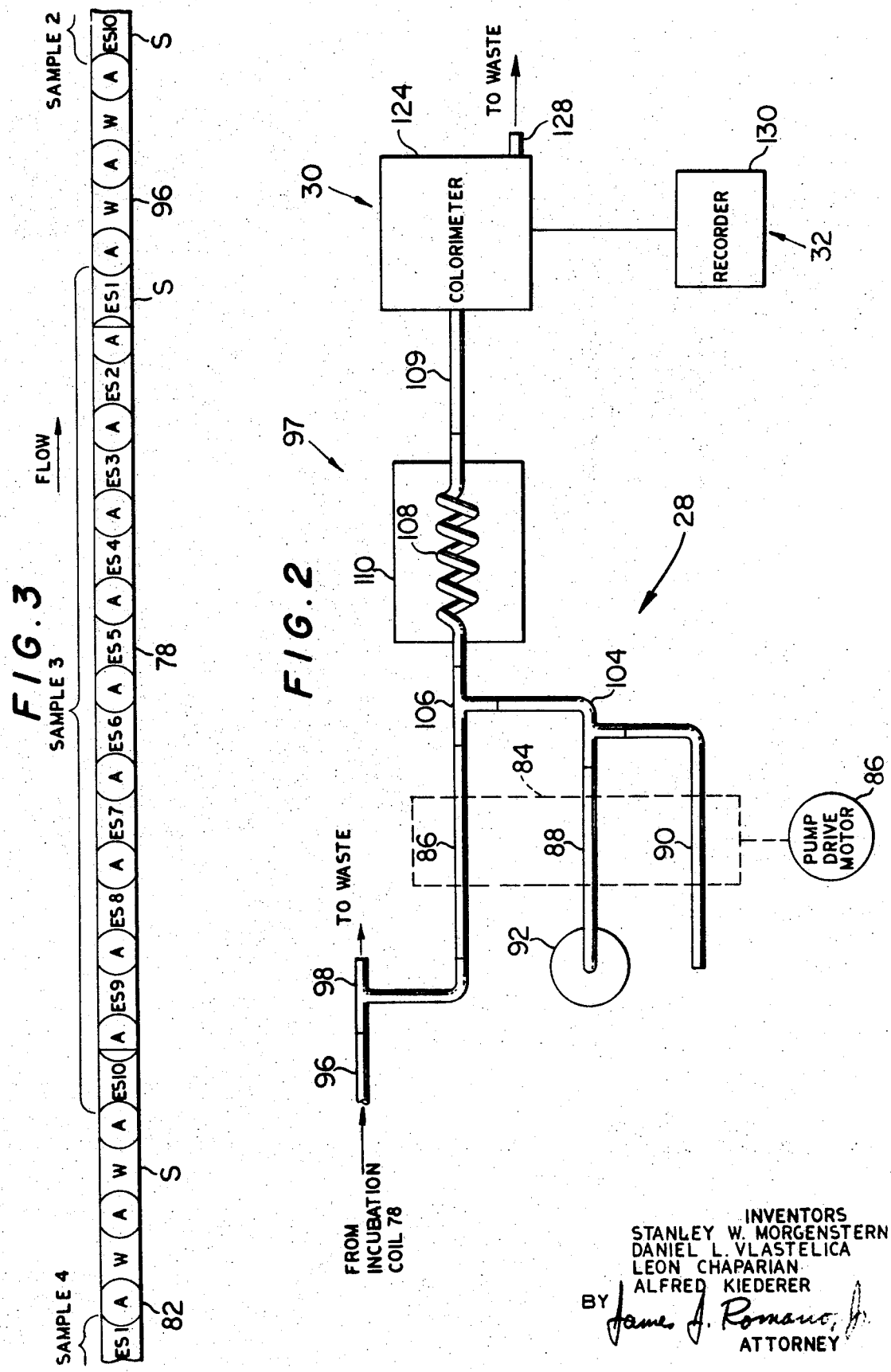

3,700,562
METHOD AND APPARATUS FOR SAMPLE ANALYSIS ON A CONTINUOUS FLOW BASIS
Stanley W. Morgenstern, Teaneck, N.J., Daniel L. Vlastelica, Pomona, N.Y., Leon Chaparian, Waldwick, N.J., and Alfred Kiederer, Mount Vernon, N.Y., assignors to Technicon Instruments Corporation, Tarrytown, N.Y.
Filed Aug. 31, 1970, Ser. No. 68,298
Int. Cl. G01n 31/14
U.S. Cl. 195—103.51 S  12 Claims

ABSTRACT OF THE DISCLOSURE

New and improved method and apparatus for the fully automatic, highly accurate quantitative analysis of a series of samples with regard to a constituent thereof on a continuous flow basis through rate reaction determination are provided and are operable through the continuous mixing of said samples and a suitable reactant in constant proportion, and the flow of the resultant sample constituent-reactant mixtures by pumping on a continuous basis through reaction promoting means to promote the sample-reactant rate reaction in such manner that different portions of each of the sample-reactant mixtures are reacted for different times to effect a differential in a characteristic of said mixtures as developed as a result of said reaction. Following this, the thusly reacted sample-reactant mixture portions are flowed through detector means for detection of said characteristic differential and resultant provision of an output signal which is indicative of the sample constituent quantity of interest. A step change in the flow rate of each of said sample-reactant mixtures through said reaction promoting means is utilized to provide for the different sample-reactant mixture portion reaction times. As specifically disclosed herein, the method and apparatus of the invention are particularly adaptable to the analysis of a series of blood samples with regard to an enzyme constituent thereof.

BACKGROUND OF THE INVENTION (1) Field of the invention

This invention relates to new and improved method and apparatus for the fully automatic, highly accurate quantitative analysis of a series of samples on a continuous flow basis through rate reaction determination and, more particularly, to such method and apparatus as are particularly applicable to the fully automatic, highly accurate quantitative analysis of a series of blood samples on a continuous flow basis with regard to one or more enzyme constituents thereof.

(2) Description of the prior art

Although a wide variety of method and apparatus are currently available for the quantitative analysis, for example, of blood samples with regard to one or more enzyme constituents thereof as described, for example, in the booklet "Diagnostic Enzymology" published by Dade Reagents Inc. of Miami, Fla. in 1966 and the undated booklet "The Theory of Enzyme Tests" as published by Boehringer Mannheim Corporation of New York, N.Y., it may be understood that no prior art method and/or apparatus are known which can provide for the automatic, highly accurate quantitative analysis of a plurality of blood samples with regard to one or more enzyme constituents thereof on a continuous flow basis.

More specifically, it may be understood that many of the currently utilized methods and apparatus for enzyme determination of the prior art are wholly or partially manual, to thus introduce the most significant disadvantages of human error and inordinately high skilled technician costs to the enzyme determination procedure, and to render the same inapplicable for use on a continuous flow basis. Too, many of the prior art methods and apparatus for enzyme determination require precise sample and substrate temperature equilibration prior to the mixing thereof since the same are not automatically brought to the same temperature prior to mixing.

Further, many of the methods and apparatus of the prior art rely, in the determination of the enzyme-substrate rate reaction, on the use of a reference standard which is constituted by an enzyme dissolved in a serum base, and the standard value of which was initially determined by classical rate reaction techniques. As a result, it is believed clear that the accuracy and validity of any enzyme determination which requires the use of such reference standard becomes wholly dependent upon the accuracy and care with which said reference standard was prepared. This is to say that any error in the preparation of said reference standard will, of course, render substantially useless the enzyme determination results of interest. Too, the respective constituents of such reference standards, and the obvious care with which the same must, of necessity, be prepared, can result in a relatively high cost of such reference standards to further disadvantage.

Another problem which arises in enzyme determination through use of the methods and apparatus of the prior art resides in the fact that the same accomplish such determination through the measurement and calibration of two points, only, of the relevant enzyme rate reaction curve, to thereby require the not always valid assumption that the results of such enzyme rate reaction would be linear between said two points. An additional significant disadvantage which is inherent in many of the prior art methods and apparatus for enzyme determination resides in the fact that the same do not always affect the measurement of the enzyme rate reaction under the most optimum conditions which occur at the initial portion of the rate reaction velocity curve, and following which substrate inhibition may occur to inhibit or limit the desired enzyme-substrate forward reaction and thus provide invalid results.

In addition, many of the methods and apparatus of the prior art are found to be significantly lacking in versatility to thus render substantially impractical the chnage from the determination of one enzyme to the determination of another enzyme.

OBJECTS OF THE INVENTION

It is, accordingly, an object of this invention to provide new and improved method and apparatus for the fully automatic, highly accurate quantitative analysis of a series of samples on a continuous flow basis through rate reaction determination.

Another object of this invention is the provision of method and apparatus as above which are particularly adaptable to the fully automatic, highly accurate quantitative analysis of a series of blood samples with regard to one or more enzyme constituents thereof.

Another object of this invention is the provision of method and apparatus as above which automatically provide for precise sample and substrate temperature equilibration prior to the mixing thereof.

Another object of this invention is the provision of method and apparatus as above which eliminate the need for the use of reference standards in such rate reaction determination.

Another object of this invention is the provision of method and apparatus as above which are of relatively simple construction, and which require the use of only readily available components of proven dependability therein to thereby provide for long periods of satisfactory, substantially maintenance-free apparatus operation.

Another object of this invention is the provision of method and apparatus as above which are of significant versatility in that the same are applicable with but minor modification to the determination of a wide variety of rate reactions.

A further object of this invention is the provision of new and improved method and apparatus as above which are particularly applicable for use in the formation of one or more enzyme analysis channels in automatic blood sample supply, treatment and analysis apparatus of the nature disclosed, for example, in United States Patents 3,134,263 and 3,241,432.

SUMMARY OF THE INVENTION

As disclosed herein, the new and improved method and apparatus of the invention are applied by way of example to the automatic quantitative analysis of a series of blood samples with regard to the determination of one or more enzyme constituents of said blood samples on a continuous flow basis through rate reaction determination. More specifically, in the quantitative analysis of a blood sample with regard to an enzyme constitutent thereof through rate reaction determination, it may be understood that said blood sample is mixed with a reactant taking the form of a substrate to effect said rate reaction, and that the concentration of said enzyme is arrived at by determining the rate at which the same catalyzes the turnover of said substrate. This is to say that the concentration of said enzyme is determined through the measurement of its catalytic activity with regard to a particular substrate by the determination of of the amount of the enzyme-substrate product formed in a certain amount of time by said rate reaction.

For such use, the apparatus of the invention comprise operatively associated sample and substrate supply means; sample and substrate supply rate control means; sample and substrate mixing and treatment means which include a mixing and incubation coil; sample and substrate mixture and color producing reagent supply, mixing and treatment means; reaction rate analysis means; and reaction rate analysis results recorder means, respectively.

In operation as generally described, a stream of a series of said samples, and a stream of said substrate are provided from said sample and substrate supply means for merger in fixed proportion with attendant air segmentation of the resultant sample-substrate mixture into a large plurality of sample-substrate mixture portions, and the resultant sample-substrate mixture is supplied to the mixing and incubation coil of said sample and substrate mixing and treatment means for appropriate incubation and promotion of the sample enzyme-substrate rate reaction of interest. Following this, the thusly incubated sample-substrate mixture is supplied to said reaction rate analysis means which take the form of a colorimeter and are operable to detect the changes in optical density of said sample-substrate mixture occasioned by said rate reaction and to provide an output which is indicative thereof to operate said recorder means.

For use in accordance with the teachings of this invention which dictate a velocity step change in the flow rate of the respective sample-substrate mixture portions through the mixing and incubation coil for each of said samples, it may be understood that said sample and substrate supply rate control means are operable to flow said sample-substrate mixture for each of said samples through said mixing and incubation coil at a "slow" flow rate until a leading portion of said sample-substrate mixture has cleared said coil, at which time said sample and substrate supply rate control means are operable to substantially instantaneously increase said flow rate through said coil to a "fast" value thereof to thus provide for a differential in the respective incubation times of the remaining sample-substrate mixture portions of the sample of interest. This incubation time differential will, of course, result in a differential in the respective optical densities developed in said sample-substrate mixture portions as a result of the enzyme-substrate reaction, and this differential in optical densities will be plotted against real time as a linear curve by said recorder means, with the slope of said curve being indicative, through suitable conversion of the amount of the enzyme of interest present in the thusly analyzed blood samples.

For use in those instances wherein the enzyme-substrate rate reaction will not produce a satisfactory detectable change in the optical density or color of the sample-substrate mixture to enable colorimetric analysis, it may be understood that the mixed and incubated sample-substrate mixture will be "sampled" at substantially constant flow rate by said fluid sample and substrate mixture and color producing reagent supply, mixing and treatment means for mixture in substantially constant, predetermined proportion with a suitable color producing reagent and subsequent flow through said colorimetric analysis means for provision of the analysis results as described.

DESCRIPTION OF THE DRAWINGS

The above and other objects and advantages of this invention are believed made clear by the following detailed description thereof taken in conjunction with the accompanying drawings, wherein:

FIG. 2 is a combined schematic and flow diagram of a portion of apparatus in the nature of those depicted in FIG. 1 but which include a secondary reaction circuit.

FIG. 3 illustrates fluid flow through the mixing and incubating coil of the apparatus of FIG. 1;

DETAILED DESCRIPTION OF THE INVENTION

Figure 1:
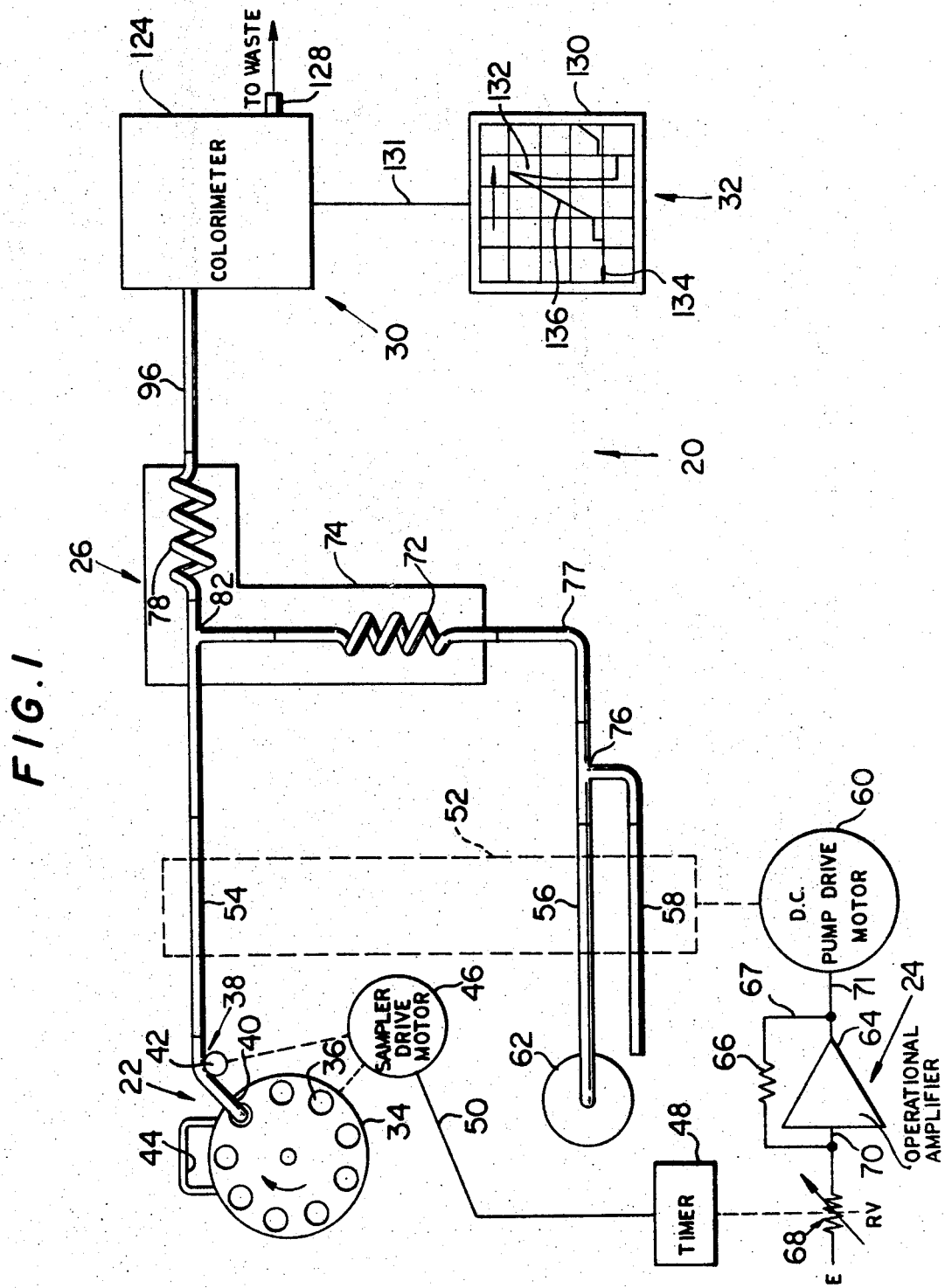
FIG. 1 is a combined schematic and flow diagram of new and improved apparatus constructed and operative in accordance with the teachings of this invention.

Referring now to FIG. 1, new and improved apparatus constructed and operative in accordance with the teachings of this invention for use in the fully automatic, highly accurate quantitative analysis of a series of fluid samples on a continuous flow basis with regard to one or more enzyme constituents thereof are indicated generally at 20, and comprise fluid sample and substrate supply means as indicated generally at 22, fluid sample and substrate supply rate control means as indicated generally at 24, fluid sample and substrate mixing and treatment means as indicated generally at 26, reaction rate detection means as indicated generally at 30, and reaction rate analysis results recorder means as indicated generally at 32, respectively.

The fluid sample and substrate supply means 22 may, for example, take the general form of those shown and described in United States Patent 3,134,263, issued May 26, 1964 to Edward B. M. De Jong and assigned to the assignee hereof, and comprise a turntable 34 upon which is disposed a generally circular array of blood sample containers 36. A sample off-take device is indicated at 38 and comprises a sample off-take probe 40 and probe operating means 42, respectively. A wash liquid receptacle 44 is disposed as shown adjacent the turntable 34, while a sample drive motor is indicated at 46 and is operatively connected as indicated by the dashed lines to drive each of the turntable 34 and the sample off-take probe operating means 42 in synchronized manner under the control of a timer 48 which is electrically connected as indicated by line 50 to said sample drive motor.

A proportioning pump which may, for example, take the general peristaltic pump form of that shown and described in United States Patent 3,227,091, issued Jan. 4, 1966 to Jack Isreeli and assigned to the assignee hereof is indicated in dashed lines at 52, and comprises compressible pump tubes 54, 56 and 58 which are progressively compressible or occludable in perfect phase relationship in the direction from left to right as seen in FIG. 1 by non-illustrated pump rollers to pump fluids therethrough. A DC pump drive motor is indicated at 60 and is, of course, operable to drive the pump 52 with the rate of fluid flow through each of the compressible pump tubes 54, 56 and 58 being determined by the respective internal diameters thereof and the rate at which said pump is driven by the DC pump drive motor 60. The outlet end of the sample off-take probe 40 is connected as indicated to the inlet end of the compressible pump tube 54, while the inlet end of the compressible pump tube 56 extends as shown into a substrate container 62 to pump substrate from the latter. The inlet end of compressible pump tube 58 is left open as shown to atmosphere to pump air therethrough.

The fluid sample and substrate supply rate control means 24 comprise an operational amplifier 64 having a feedback resistor 66 connected thereacross in line 67 in conventional manner, and a potentiometer 68, having a variable resistance RV, connected as shown in line 70 at the input side of said operational amplifier. The output of the operational amplifier 64 is applied as indicated on line 71 to energize the DC pump drive motor 60 to drive the latter. The timer 48 is operatively connected as indicated by the dashed line to the potentiometer 68 to enable the precise control of the variable resistance RV, and accordingly of the speed of the DC pump drive motor 60, at any point in time from said timer. More specifically, it may be understood that the speed of the DC pump drive motor 60 at any point in time may be determined in accordance with Equation 1 as follows:

(Equation 1) $$Vm = kE \frac{RF}{RV}$$

wherein; $Vm$ equals the speed of rotation of DC pump drive motor 60, $k$ equals a constant, E equals the input voltage applied as indicated to line 70, RF equals the resistance of feedback resistor 66 and RV equals the resistance of the potentiometer 70.

The speed of the pump drive motor 60 and accordingly, the respective sample and substrate supply rates provided by the pump 52, may respectively be precisely determined and varied as controlled by the timer 48.

The fluid sample and substrate mixing and treatment means 26 comprise a substrate pre-incubation coil 72 which is disposed as indicated in suitable temperature control means in the nature, for example, of a temperature control bath 74 which is effective to maintain the temperature of said coil substantially at a desired level. A junction conduit is indicated at 76 and the junction conduit inlets are connected as shown to the respective outlet ends of compressible pump tubes 56 and 58, while the outlet of the junction conduit 76 is connected as shown by a connecting conduit 77 to the inlet of the substrate pre-incubation coil 72.

A substrate and sample mixture incubation coil is indicated at 78 and is also disposed as shown in the temperature control bath 74 which is of course effective to maintain the temperature of the said incubation coil substantially at the same desired level as pre-incubation coil 72. In addition, a substantial portion of the sample stream inlet of the junction conduit 82 is also disposed as shown in the temperature control bath 74 for obvious purpose. A junction conduit is indicated at 82 and the respective outlets of the compressible pump tube 54 and the substrate preincubation coil 72 are connected as shown to the inlets of the junction conduit 82, while the outlet of said junction conduit is connected to the inlet of the substrate and sample mixture coil 78. As a result of this arrangement it is believed made clear that substantially precise sample and substrate temperature equilibration is automatically achieved to significant advantage in that the same are automatically brought to substantially the same temperature prior to the merger thereof in junction conduit 82.

The reaction rate detection means 30 comprise a colorimeter as indicated at 124 which, of course, includes a non-illustrated colorimeter flow cell, and which will probably include non-illustrated debubbler means disposed upstream of said flow cell to effect the substantial removal to atmosphere of any gas segments in the fluid stream flowing therethrough. A conduit 96 is provided to connect the outlet of the incubation coil 78 to the inlet of said non-illustrated colorimeter flow cell to flow fluids therethrough for enzyme rate reaction detection purposes in accordance with the optical density of said fluids as determined by said colorimeter means in conventional manner. A colorimeter outlet conduit 128 is provided to flow fluids to waste after the passage thereof through said colorimeter means.

The reaction rate analysis results recording means 32 prise a DC null-balance type strip chart recorder 130 having a strip chart 132 which is driven in the indicated direction, and a recording pen or stylus 134 operatively associated with said strip chart and operable to trace a curve 136 on the latter to provide a permanent and readily reproducible record of the enzyme rate reaction analyses of interest as described in greater detail hereinbelow.

The form of the apparatus of the invention for use in those instances wherein the enzyme-substrate rate reaction will not produce a satisfactorily detectable change in the optical density of the sample-substrate mixture to enable colorimetric analysis of the latter is indicated generally at 97 in FIG. 2 and may be seen to include secondary, sample-substrate mixture and color producing reagent supply, mixing and treatment means as indicated generally at 28 and which are operatively disposed as shown intermediate the incubation coil 78 and the colorimeter 124.

The secondary circuit means 98 comprise a proportioning pump as indicated in dashed lines at 84 and which may, for example, take the same peristaltic pump form as the pump 52. The proportioning pump 84 is driven at constant speed by an AC pump drive motor 86, and comprises compressible pump tubes 86, 88 and 90 which are again respectively compressible or occludable in perfect phase relationship by non-illustrated pump rollers in the direction from left to right to pump fluids therethrough in said direction.

A junction conduit is indicated at 98 and the inlet thereof is connected as shown to the outlet of the conduit 96 to flow the sample-substrate mixture stream to said junction conduit. One outlet of the junction conduit 98 extends as shown to waste, while the other outlet thereof is connected as shown to the inlet of compressible pump tube 86. The inlet of compressible pump tube 88 extends as shown into a container 92 of a suitable color producing reagent, while the inlet of compressible pump tube 90 is left open to atmosphere.

A junction conduit is indicated at 104 and functions to merge the respective reagent and air outputs of pump tubes 88 and 90 to thus air-segment the reagent stream provided by the former. This air-segmented reagent stream is merged as shown in a junction conduit 106 with the sample-substrate stream from compressible pump tube 86.

A mixing coil is indicated at 108 and the outlet of junction conduit 106 is connected as shown to the inlet of said mixing coil. Temperature control means which may again, for example, take the form of a temperature control bath are indicated at 110 and are effective to maintain the temperature of the mixing coil 108 at a desired level.

A conduit 109 is provided to connect the outlet of mixing coil 108 to the inlet of the colorimeter 124 for the flow of the suitably mixed and reacted, air-segmented sample-substrate-reagent stream to the latter.

OPERATION

In operation as generally described for the quantitative analysis of a series of samples with regard to a constituent thereof through the mixture on a continuous flow basis of each of said samples with an appropriate reactant to effect a constituent-reactant rate reaction with attendant change in a detectable characteristic of the resultant sample-reactant mixture, it may be understood that the extent to which said rate reaction is enabled to proceed is varied for different portions of said sample-reactant mixture to generate a detectable differential in said mixture, which differential is indicative of the rate of said reaction, and accordingly of the quantity of said constituent, and that said characteristic differential is subsequently detected to provide the desired results.

More specifically, and for use, for example, in the quantitative analysis of a plurality of blood samples to determine the amount of the enzyme constituent alkaline phosphatase present in each of said blood samples, through the reaction thereof with an appropriate reactant taking the form of a substrate in the nature of the synthetic substrate para-nitrophenylphosphate, by the mixture of said enzyme and substrate, and the measurement of the rate reaction therebetween at a large plurality of different incubation times during said reaction, it may be understood that each of the sample containers 30 on the turntable 34 would be filled with a blood serum sample from a different patient, while the substrate container 62 would be filled with said synthetic substrate. It is believed clearly understood by those skilled in this art that the use of the secondary supply, mixing and treatment means 28 would not be required for the quantitative analysis of blood samples with regard to the enzyme alkaline phosphatase. The temperature control means 74 would be adjusted, if necessary, to maintain the respective temperature of the substrate pre-incubation coil 72 and the substrate and sample mixture incubation coil 78 at substantially 37° C. Too, the timer 48 and potentiometer 68 would be adjusted to provide for the continuous cycling of the speed of rotation $V_m$ of the DC pump drive motor 60 in substantially hyperbolic manner between a first or "fast" speed $V_2$ and a second or "slow" speed $V_1$ for each sample-substrate mixture as described in much greater detail hereinbelow.

With the apparatus 20 arranged as described, the turntable 34 is intermittently rotated, or indexed, to present each of the blood serum sample containers 36 in turn to the sample off-take probe 40, while the latter is in turn intermittently operated to immerse the inlet end of said probe in a thusly presented sample container for a predetermined period of time to aspirate, through compressible pump tube 54, a predetermined volume of the blood serum samples from said container, to then transfer said off-take probe inlet end through the ambient air for immersion in the wash liquid receptacle 44 for a predetermined period of time to thus aspirate a predetermined volume of ambient air for use as a separating and cleansing fluid, followed by a predetermined volume of said wash liquid therethrough for similar purpose, and to again transfer said off-take probe inlet end through the ambient air for immersion in the next presented sample container 36 for a predetermined period of time, to thus aspirate another predetermined volume of ambient air therethrough and commence the aspiration of a like, predetermined volume of the blood serum sample from said next presented sample container.

As a result, it may be understood that a fluid stream consisting of successive, predetermined volumes of said blood serum samples as spaced, in each instance, by a segment of air, a slug of said wash liquid, and a segment of air, respectively, will be supplied from the sample off-take probe 40 through compressible pump tube 54 to the relevant inlet of junction conduit 82.

Concomitantly, a stream of the substrate will be aspirated from the substrate container 62 through compressible pump tube 56, and a stream of ambient air will be aspirated through the compressible pump tube 58 for merger as indicated with said substrate stream at the junction conduit 76 with resultant air segmentation of said substrate stream and supply thereof through connecting conduit 77 to the substrate preincubation coil 72. Flow of this air-segmented substrate stream through said pre-incubation coil will, of course, result in suitable substrate pre-incubation to the desired extent as determined of course by the coil temperature, the substrate flow rate through said pre-incubation coil, and the effective length of the latter. Following this, the thusly air-segmented and pre-incubated substrate stream will flow as indicated to the other inlet of junction conduit 82 for merger therewithin with the sample stream flowing thereto as described from compressible pump tube 54.

As a result of this merger of the sample and substrate streams, and referring now to FIG. 3 which dipicts the incubation coil 78 in straight-line manner for purposes of illustration, it may be understood that a sample-substrate mixture stream S consisting of successive ones of said blood samples as mixed with said substrate, and as preceded and followed by air, wash liquid and air segments, respectively, will be flowed from the junction conduit 82 to and through the substrate and sample mixture incubation coil 78.

Figure 4:
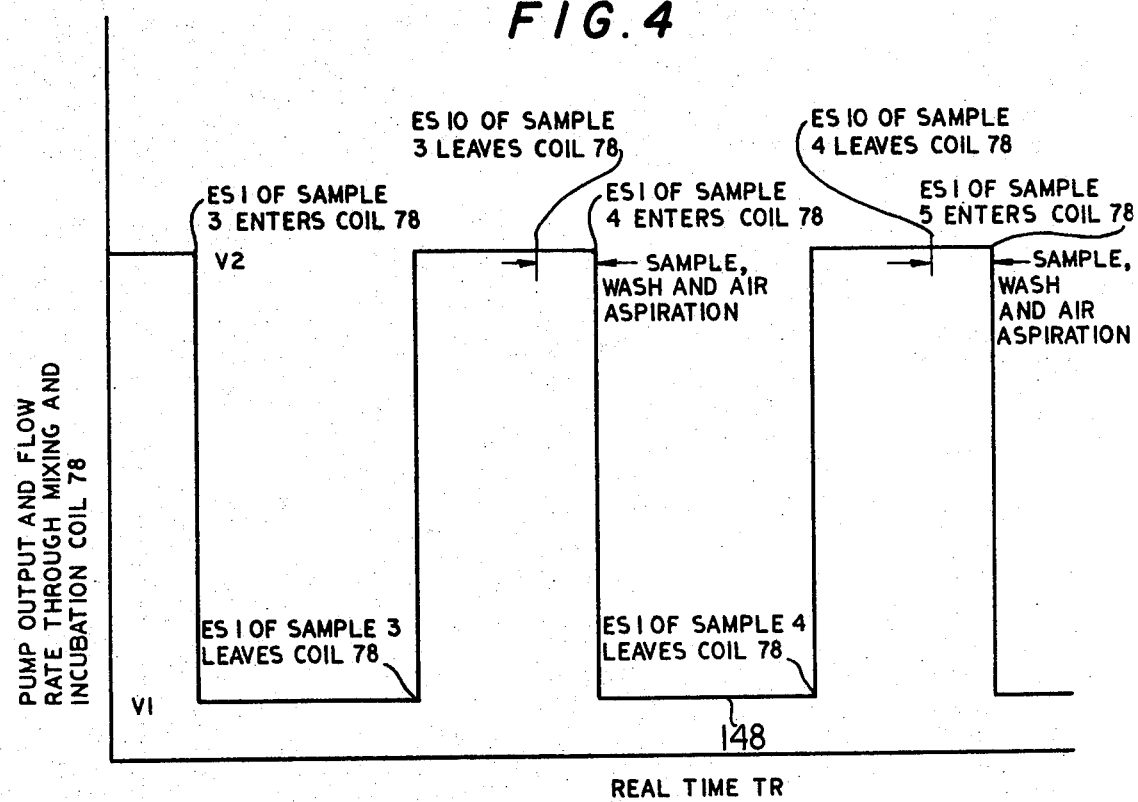
FIG. 4 is a graph of pump output and flow rate through the mixing and incubation coil of FIGS. 1 and 2 as plotted against real time for step wise variation in said pump output and flow rate.

Assuming for example that each of said sample-substrate mixtures is divided or air-segmented into ten sample-substrate mixture volumes or slugs and that the total volume of a thusly air-segmented sample-substrate mixture is approximately 25% greater than the total volume of the incubation coil 78, it may be understood that FIG. 3 depicts the apparatus 20 substantially at the point in time wherein the leading sample-substrate mixture segment ES1 of sample 3 has completed its flow through the mixing and incubation coil 78, and that this flow of said ES1 segment through said mixing and incubation coil will have occurred at the flow rate which corresponds to the operation of the pump drive motor 68 at said "slow" or V1 velocity thereof. Just as this leading sample-substrate mixture segment ES1 reaches this position, it may be understood that timer means 48 will be effective to substantially instantaneously change the value of the variable resistance RV of the potentiometer 68 to result in the substantially instantaneous shifting of the pump drive motor 60 to the "fast" velocity V2 thereof with attendant immediate increase in the flow rate of the sample-substrate mixture stream S through the incubation coil 78. The pump drive motor 60 will be maintained at this V2 velocity for the duration of the flow of the remainder of the sample-substrate mixture segments ES2 through ES10 of sample 3 through the incubation coil 78. This change in the pump output and flow rate through the mixing and incubation coil 78 is believed clearly illustrated by the graph of FIG. 4 wherein the curve 148 represents pump output and flow rate through said coil 78 as plotted against real time TR for samples 3 and 4.

As a result of this step change in pump drive motor velocity, and accordingly of the flow rate of the sample-substrate mixture segments for sample 3 through the incubation coil 78, it may be understood that the first sample-substrate mixture segment ES1 of sample 3 will have spent all of its time in flowing through the incubation coil 78 at a flow rate corresponding to the "slow" motor velocity V1, while the last sample-substrate mixture segment ES10 of sample 3 will have spent all of its time in flowing through the incubation coil 78 at a flow rate which corresponds to the "fast" pump drive motor speed V2. Each of the intervening sample-substrate mixture segments ES2 through ES9 of sample 3 will have spent successively less time in flowing through the incubation coil 78 as determined by the respective segments positions at the time the pump drive motor is shifted as described from V1 to V2. Accordingly, each of said sample-substrate mixture volumes or segments ES1 through ES10 will have spent a linearly decreasing incubation time, in that order, in the mixing and incubation coil 78. As a result, it is believed clear that the extent to which the enzyme-substrate rate reaction of interest is enabled to proceed in said incubation coil for each of said segments or portions ES1 through ES10 will likewise be decreased substantially linearly to thus provide for a decrease in the respective optical densities of said portions which are developed as a result of said rate reaction. An optical density differential will thus be provided, and such differential may readily be utilized as described in detail hereinbelow to arrive at the enzyme quantity results of interest.

Figure 5:
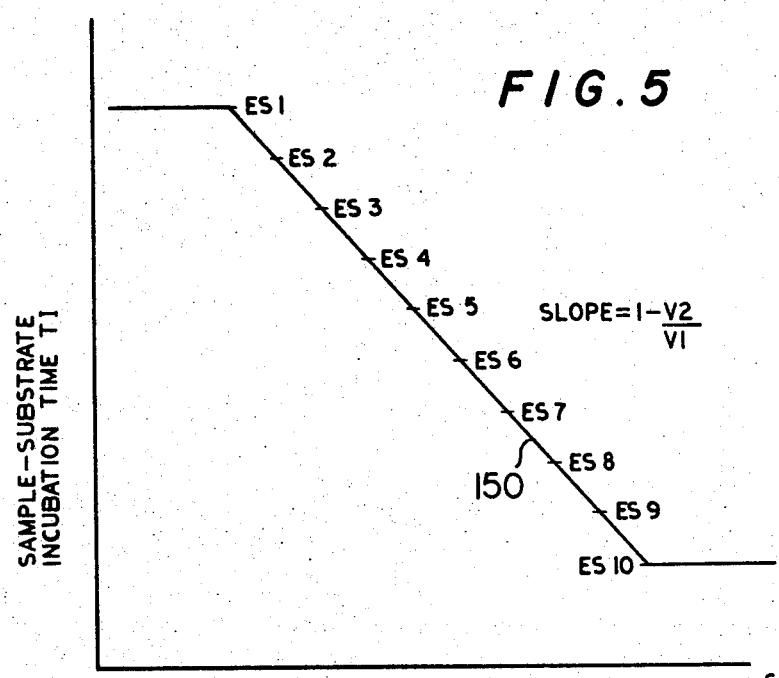
FIG. 5 is a graph of sample-substrate incubation time as plotted against real time.

This differential in respective incubation times of the sample-substrate mixture segments ES1 through ES10 is believed clearly illustrated by the graph of FIG. 5 wherein the curve 150 illustrates the respective incubation times TI for each of the sample-substrate segments ES10 through ES1 as plotted against real time TR. The slope of the curve 150 will be equal to $1-V2/V1$.

Upon exit from the incubation coil 78, the sample-substrate stream S will flow through conduit 96 to the colorimeter means 124 with the non-illustrated debubbler means of the latter functioning, if included, to remove the respective inter sample and intra sample air segments therefrom, whereupon the now substantially air-segment-free stream will flow through the non-illustrated colorimeter flow cell for colorimetric analysis thereof, and therefrom to waste as indicated through conduit 128. As the said sample-substrate mixture stream S flows through said colorimeter flow cell, the same will be colorimetrically analyzed in accordance with the variations in the optical densities of the respective mixture portions, with the resultant provision of an appropriate electrical output indicative of said colorimetric analysis to the recorder 130 on line 131 and attendant provision by said recorder of a readily interpretable and reproducible curve on the recorder strip chart 132.

Figure 6:
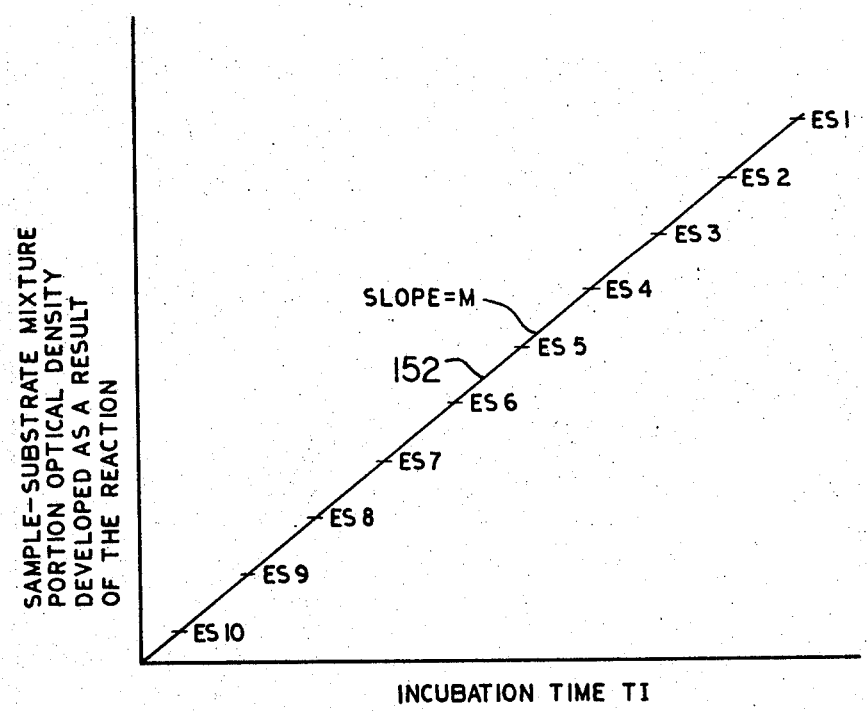
FIG. 6 is a graph of sample-substrate optical density developed as the result of the reaction as plotted against sample-substrate incubation time.

More specifically, the differential in the optical densities of the respective sample-substrate mixture portions ES10 through ES1 that will be developed as a result of the incubation thereof at different incubation times TI is clearly illustrated by the graph of FIG. 6 wherein the linear curve 152 which is, of course, characteristic of a linear type rate reaction, represents said optical densities as plotted against said incubation times, and it will be clear to those skilled in this art that the slope M of the curve 152 of FIG. 5 does in fact represent the value of interest with regard to the enzyme concentration in the blood sample 3 under discussion.

Figure 7:
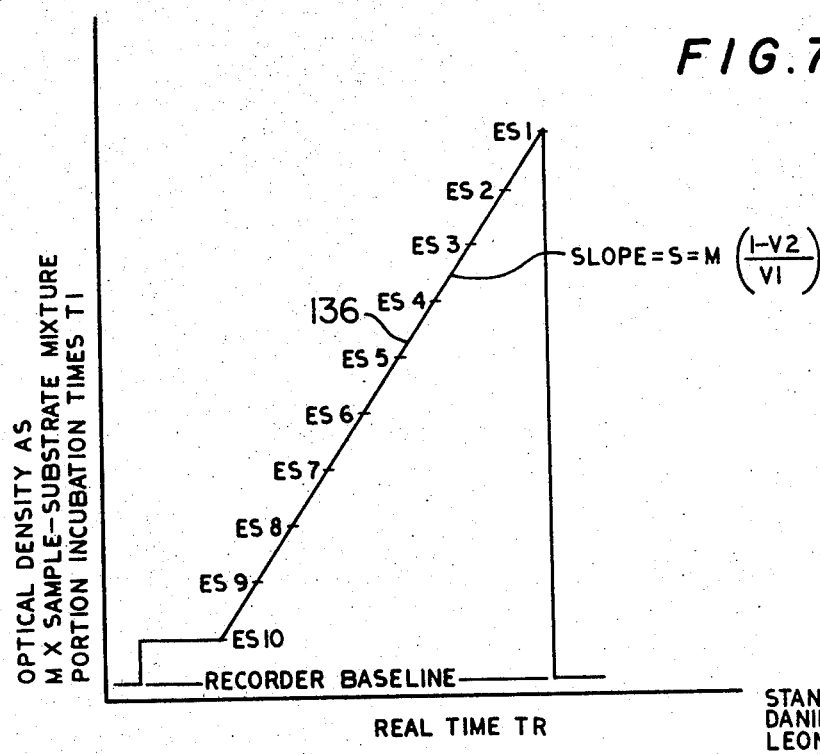
FIG. 7 is a graph of sample-substrate optical density developed as a result of the reaction as plotted against real time by the recorder of the apparatus of FIG. 1.

The relevant portion of the actual curve 136 plotted as illustrated in FIG. 7 by the strip chart recorder 130 for the sample 3 under discussion is, although linear, representative instead of M (the slope of curve 152 of FIG. 6) times the respective sample-substrate mixture incubation times TI as plotted against real time TR for each of the sample-substrate segments ES10 through ES1. The slope S of the curve 136 of FIG. 6 is, however, related to the slope M of interest of the curve 152 of FIG. 5 as follows:

(Equation 2)
$$M = \frac{S}{1 - \frac{V2}{V1}}$$

Thus, interpretation of the recorder chart curve 136 would, of course, require the determination of the slope S of the curve 136 and the conversion thereof in accordance with Equation 2. Following this, the actual quantitative determination of the enzyme of interest in blood sample 3 under discussion may be readily and precisely determined through use of the following standard equation:

(Equation 3) $\frac{mIu}{mI} = M \times 10^6 \times \frac{TV}{SV} \times \frac{1}{e}$ wherein; $mIu/ml$ equals the milli international units of enzyme per millimeter of blood sample, TV equals the total sample and substrate volume, SV equals the sample volume which when divided into TV gives the dilution factor, and $e$ equals the molar extinction coefficient as determined for the apparatus in question.

Referring again to the speed of operation of the DC pump drive motor 60, and accordingly to the sample enzyme mixture flow rate through the mixing and incubation coil 78 provided by the proportioning pump 52 as illustrated by the curve 148 of FIG. 3, it may be understood that operation of said pump drive motor at the "fast" or V2 velocity thereof will be continued to minimize the time required for the aspiration of the succeeding blood samples, and wash liquid and inter-blood sample air segments, respectively, until such time as the first sample-substrate mixture volume or segment ES1 of the succeeding blood sample 4 has just reached the inlet end of the incubation coil 78. As this occurs, the timer 48 will be effective to substantially instantaneously return the variable resistance RV of the potentiometer 68 to the initial value thereof to substantially instantaneously return the DC pump drive motor 60 to the "slow" or V1 velocity thereof with concomitant reduction in the flow rate of the sample-substrate mixture segments of blood sample 4 to and/or through the mixing and incubation coil 78. Again, as the leading sample-substrate mixture segment ES1 of sample 4 completes its flow through the mixing and incubation coil 78, the pump drive motor will be substantially instantaneously shifted to the "fast" or V2 velocity thereof.

Operation of the apparatus 20 is, of course, automatically continuous as described with the DC pump drive motor 60 being shifted to the "slow" velocity thereof just prior to the entry of the first sample-substrate volume or segment ES1 of each of the blood samples into the incubation coil 78, and being shifted to the "fast" or V2 velocity thereof substantially coincident in point of time with the completion of the flow of said leading sample-substrate mixture segment or volume ES1 through said incubation coil.

For use as described with a total available apparatus cycle time per blood sample analysis of approximately three minutes, of which 160 seconds are available for blood sample and substrate mixing and incubation, and the remaining 20 seconds of which are utilized for blood sample, wash liquid and inter sample air segment aspiration, it may be understood that the DC pump drive motor 60 may be operated at the "slow" or V1 velocity thereof for approximately 160 of these seconds to provide for a maximum sample-substrate incubation time of 160 seconds, and may be operated at the "fast" or V2 velocity thereof for approximately 20 of these seconds to provide for an approximately 20 second period for blood sample, wash liquid and inter sample air segment aspiration. Too, a preferable ratio between V2 and V1 velocities of the pump drive motor 60 may, for example, be approximately 6:1. In addition, for analysis as described of the blood sample with regard to the enzyme alkaline phosphatase through use of the synthetic substrate para-nitrophenylphosphate, it may be understood that the respective internal diameters of the compressible pump tubes 54 and 56 might be arranged to provide for a substrate to enzyme ratio of approximately 20:1.

For use of the apparatus of the invention in the quantitative analysis of a plurality of blood samples with regard to an enzyme in the nature of creatine phosphokinase, or CPK, through the reaction thereof with a substrate in the nature of creatine phosphate, it will be understood by those skilled in this art that use of the apparatus 97 of FIG. 2, which include the secondary, sample and substrate mixture and color producing reagent supply, mixing and treatment means 28 to add a suitable color producing reagent to the incubated and reacted sample-substrate mixtures to provide for a readily detectable change in the optical density thereof, will become necessary. More specifically, and for such use, it may be understood that the pump drive motor 86 would be operated to drive proportioning pump 84 at constant speed. For quantitative analysis as described with regard to the enzyme CPK, the color producing reagent container 92 would be filled with an appropriate color producing reagent in the nature, for example, of diacetyl orcinol.

In operation, the respective fluid sample and substrate supply means 22, fluid sample and substrate supply rate control means 24, fluid sample and substrate mixing and treatment means 26, reaction rate detection means 30, and reaction rate analysis results recorder means 32 would be operated substantially as described hereinabove with the described results insofar as operation to the downstream end of the incubation coil 78 is concerned. Under these conditions, however, as the suitably incubated sample-substrate mixture stream S flows into junction conduit 98 through conduit 96, the same would in essence be "sampled" at substantially constant flow rate through the relevant outlet of said junction conduit and compressible pump tube 86 while the excess thereof, if any, would simply be flowed to waste as indicated through the other outlet of junction conduit 98; it being understood that the substantially constant pumping rate through compressible pump tube 86 would preferably be arranged through appropriate choice of compressible pump tube internal diameter and pump velocity to insure that said pumping rate would, under all conditions, be less than the flow rate through conduit 96.

Concomitantly, the color producing reagent would be pumped at substantially constant flow rate from container 92 to junction conduit 104 and air-segmented in the latter by the ambient air pumped thereto at substantially constant flow rate through compressible pump tube 90, with the resultant air-segmented color producing reagent stream being merged as indicated with the sample-substrate mixture stream S in the junction conduit 106. Following this, the resultant sample-substrate-reagent mixture stream would be flowed to and through the coil 108 for thorough mixing and heating and/or simple time delay, depending upon the nature of the desired reaction as discussed hereinabove.

Upon exit from the coil 108, the now suitably incubated and reacted sample-substrate-reagent mixture stream would be flowed through conduit 109 to and through the non-illustrated flow cell of the colorimeter 124 as described for automatic, successive colorimetric analysis of the respective blood sample and attendant provision of the readily interpretable and reproducible curve 136 on the strip chart 132 of the recorder 130 as described.

Although disclosed hereinabove by way of illustrative example, only, as directed to the colorimetric quantitative analysis of a plurality of blood serum samples with regard to a particular enzyme constituent thereof, it is believed clear that the new and improved method and apparatus of this invention would be equally applicable for use in such enzyme determination with regard to fluid samples other and different than blood serum samples. Too, it is believed equally clear that the new and improved method and apparatus of the invention would also be particularly applicable to the determination as described of rate reactions between substances other and different than enzymes and substrates, respectively, for quantitative analysis of samples which may or may not be blood samples with regard to said other and different substances.

Although disclosed by way of example as operating in "slow to fast" manner attendant the stepwise variation in the pump drive motor speed concomitant with the flow of the sample-substrate mixture for each of said blood samples through the mixing and incubation coil 78, it is believed clear that said apparatus can, alternatively, be operated in "fast to slow" manner attendant such stepwise variation. Further, although disclosed for purpose of example as a single channel device, it may be understood that the apparatus of the invention may, of course, be operated as a multi-channel device to substantially increase the rate of analyses performed thereby per hour. Thus, for example, the turntable 34 might include four generally concentric, circular arrays of sample containers, and four simultaneously operable sample off-take means 38 might be provided with similar duplication in compressible pump tubes, pre-incubation and mixing and incubation coils, connecting conduits, colorimeter flow cells, and strip chart recorder means to enable the substantially concomitant enzyme analysis of four blood samples per apparatus cycle. As a further alternative, the apparatus 20 might be arranged and operated to effect the colorimetric quantitative analysis of, for example, each of a plurality of blood samples with regard to four different enzyme constituents thereof and such could, of course, be readily effected through the division of the sample as aspirated through the sample off-take probe into four portions and the provision of four substantially concomitant mixing, incubation, and colorimetric analysis of each of said sample portions with regard to a different enzyme constituent thereof.

The nature of the particular rate reaction of interest may, of course, require the use of detector means other and different than colorimeter means in the analysis results detector means 30. Thus, for example, said detector means may take the form of a fluorometer. Too, an AC drive motor may, of course, be substituted for the disclosed DC pump drive motor 60.

With regard to the use of the respective air segments, and especially the respective intra sample-substrate mixture air segments, it is believed clear that the primary function thereof is a cleansing function and that the same can be eliminated. Accordingly, the term "portions" as used in this specification is by no means intended to be limited in meaning to different parts of a sample-substrate mixture as are in fact physically separated by a separating fluid in the nature of said intra sample-substrate mixture air segments, but rather, is intended to define different parts of a said sample-substrate mixture as may or may not be physically separated. Further, and with regard to the recorder means 32, it is believed clear that the same may further include digital read-out and/or print-out means which could be operated concomitantly with the strip chart recorder 130 through the use of appropriate circuit and switching components in the nature of average slope detector means which would, of course, function to convert the analog output as applied from the colorimeter 124 on line 131 into suitable digital form for application to said digital read-out and/or print-out means.

From all of the foregoing, it is believed clear that the method and apparatus of the invention are particularly adaptable for incorporation in automated blood sample analysis equipment of the nature disclosed in U.S. Pat. 3,134,263 issued May 26, 1964 to Edward B. M. De Jong assigned to the assignee hereof, and/or U.S. Pat. 3,241,432, issued Mar. 22, 1966 to Leonard T. Skeggs, et al. and assigned ot the asignee hereof.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A method of continuous-flow analysis for a constituent of interest of a plurality of different liquid samples seriatum comprising:
    flowing a stream of a fluid reagent to react with each sample into the inlet of a first conduit portion having an outlet, for discharge of said reagent, coupled to an inlet of a second conduit portion, which second conduit portion comprises a reaction chamber having an outlet;
    flowing each liquid sample seriatum in a stream into an inlet of said reaction chamber for treatment by exposure to said reagent therein over a period of time as the combined sample-reagent stream flows toward said outlet of said reaction chamber, the samples being maintained substantially separate and apart from one another in the last-mentioned stream;
    varying the rate of flow of each such treated sample through said chamber in a stepwise manner, each such variation being the same for each such treated sample and over the same time period, so that a portion of the sample has a longer residence time in said chamber than another portion of the same sample; and
    analyzing the quantities of the reaction product of each such treated sample over a period of time including said longer and shorter residence times, as a measurement of the quantity of said constituent of interest in each sample.

2. The method as defined in claim 1, wherein said reaction chamber comprises an incubator, each such treated sample being pumped through said incubator.

3. The method as defined in claim 1, wherein said sample is a blood sample, said constituent is an enzyme, said reagent is an appropriate substrate, and said analysis is of the optical density of the sample-substrate mixture.

4. The method as defined in claim 1, further comprising the step of, adding a reagent to said treated and reacted sample portions to effect a secondary reaction thereof.

5. The method as defined in claim 4, wherein said secondary reaction proceeds for substantially the same period for each of said treated sample portions.

6. The method as defined in claim 4, wherein the addition of the reagent for the secondary reaction is a color-producing reagent, the last-mentioned reagent addition is affected by the sampling of said sample portions at substantially constant flow rate, and the addition of said color-producing reagent is in substantially constant, predetermined proportion.

7. Apparatus of the continuous-flow type for analysis of a constituent of interest of a plurality of different liquid samples seriatum comprising; a source of discrete liquid samples; a reagent source; a reaction chamber having inlet means and having outlet means; a first conduit having a sample inlet and having an outlet connected to said inlet means of said reaction chamber; a second conduit having a reagent inlet and having an outlet coupled to said inlet means of said reaction chamber; means for flowing said sample liquid and said reagent in the respective first and second conduits through said inlet means for treatment of each liquid sample by exposure to said reagent within said reaction chamber over a period of time as the combined sample-reagent stream flows toward said outlet of said reaction chamber, the samples being maintained substantially separate and apart from one another in the last-mentioned stream; means for varying the rate of flow of each such treated sample through said chamber in a stepwise manner, each such variation being the same for each treated sample and over the same time period, so that a portion of the sample has a longer residence time in said chamber than another portion of the same sample; and analysis means coupled to said outlet means of said reaction chamber for analyzing the quantities of the reaction product of each such treated sample over a period of time including said longer and shorter residence times, as a measurement of the quantity of said constituent of interest in the sample.

8. Apparatus as defined in claim 7, wherein: said means for flowing said liquid sample and said reagent in the respective first and second conduits and said means for varying the rate of flow of each of said treated samples through said chamber comprises pump means, and said reaction chamber comprises an incubator.

9. Apparatus as defined in claim 8, wherein: said pump means is driven at a relatively fast speed and at a relatively low speed to vary the flow of each of said treated samples through said chamber.

10. Apparatus as defined in claim 9, wherein: said pump speed has a stepwise variation during the flow of each of said treated samples through said chamber.

11. Apparatus as defined in claim 7, further comprising a third conduit having an inlet coupled to said outlet means of said chamber to receive from said chamber the reaction products thereof, said third conduit having an outlet coupled to said analysis means, and means to flow a reagent into said third conduit to effect a secondary reaction therein.

12. Apparatus as defined in claim 11, wherein: said reagent is a color-producing reagent flowing in substantially constant predetermined proportion, and said analysis means comprises a colorimeter.

References Cited
UNITED STATES PATENTS

| | | | |
|---|---|---|---|
| 3,437,447 | 4/1969 | Harmon | 195—103.5 R |
| 3,526,480 | 9/1970 | Findl et al. | 23—253 |
| 3,542,515 | 11/1970 | Scott | 195—103.5 R |
| 3,241,432 | 3/1966 | Skeggs et al. | 23—253 R |

ALVIN E. TANENHOLTZ, Primary Examiner

U.S. Cl. X.R.

195—127; 23—230 B, 253 R